US006718334B1

(12) United States Patent
Han

(10) Patent No.: US 6,718,334 B1
(45) Date of Patent: Apr. 6, 2004

(54) COMPUTER IMPLEMENTED DOCUMENT AND IMAGE MANAGEMENT SYSTEM

(75) Inventor: Ken Han, Lawrenceville, GA (US)

(73) Assignee: Inter American Data, L.L.C., Lawrenceville, GA (US)

( * ) Notice: Subject to any disclaimer, the term of this patent is extended or adjusted under 35 U.S.C. 154(b) by 0 days.

(21) Appl. No.: 09/579,998

(22) Filed: May 26, 2000

Related U.S. Application Data

(60) Provisional application No. 60/136,419, filed on May 28, 1999.

(51) Int. Cl.[7] ............................. G06F 17/00; G06F 7/00
(52) U.S. Cl. ..................................... 707/102; 707/104.1
(58) Field of Search .............................. 707/1–5, 102, 707/104.1; 709/318, 321, 323

(56) References Cited

U.S. PATENT DOCUMENTS 5,907,835 A * 5/1999 Yokomizo et al. ............. 707/1
6,260,044 B1 * 7/2001 Nagral et al. ............... 707/102

OTHER PUBLICATIONS eFileClerk "Document Imaging and Management Solutions", downloaded from www.efileclerk.com on Aug. 5, 2002.*
eFileClerk "Data Archiving and Document Imaging Solutions", downloaded from www.eresolve.com/downloads/eFileClerkBrch.pdf on Aug. 1, 2002.*
J.D. Edwards "Enhance Document Appearance, Delivery and Retrieval", Oct. 5, 2001.*
Dickey, S. "Imaging System Deals Tropicana a Winning Hand", Midrange Systems, vol. 13, No. 4, Mar. 13, 2000.*
MacSweeney, G. "How to Solve a MEGA Call Center Problem", Insurance & Technology, vol. 24, No. 7, Jul. 1999, p. 24.*
"Trucking Company Gears up With Imaging", AS/400 Systems Management, vol. 26, No. 7, Jul. 1998, pp. 62–66.*
BusinessWire, "Intentia Continues On Strategic Growth Path, Acquires Inter–American Data, Inc.", Jun. 23, 1998.*
Pietrek, M. "Under the Hood", Microsoft Systems Journal, vol. 11, No. 12, Dec. 1996, pp. 67–72.*

* cited by examiner

Primary Examiner—John Breene
Assistant Examiner—Luke S Wassum
(74) Attorney, Agent, or Firm—Myers & Kaplan, LLC

(57) ABSTRACT

An improved document and image management system ("DIM system") is provided for use by a digital computer in combination with a video display or other suitable output means to provide an system that operates, preferably, under the Microsoft Windows® shell environment and which, further, is cross-platform capable and application independent. With respect to the data, document, or image to be managed, the invention operates independently of both the computer platform and the application software therein operating that was used to create the data, document, or image. The programming method of the present invention obtains the indices needed to create an image from the application running on the Windows® desktop; and, thereafter, electronically files, or otherwise processes, the image. Such functionality is provided by targeting a data stream that is refreshing the graphical user interface ("GUI") of a screen running on the Windows® desktop. The programming method of the present invention image-enables the entire Windows® desktop, so that all applications running in windows thereunder are provided with integrated DIM system functionality.

20 Claims, 3 Drawing Sheets

Microfiche Appendix Included
(3 Microfiche, 145 Pages)

Before Integration:

After integration:

Flow chart of the invention:

COMPUTER IMPLEMENTED DOCUMENT AND IMAGE MANAGEMENT SYSTEM

CROSS-REFERENCE TO RELATED APPLICATIONS

The inventor hereof claims priority based upon and pursuant to U.S. Provisional Patent Application Ser. No. 60/136,419 filed May 28, 1999.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

STATEMENT REGARDING FEDERALLY SPONSORED RESEARCH OR DEVELOPMENT

Not applicable.

MICROFICHE APPENDIX

A portion of the disclosure hereof is embodied within a Microfiche Appendix comprising a total of three (3) microfiche sheets having a total of one hundred forty-five (145) frames.

FIELD OF THE INVENTION

This invention relates, generally, to computer implemented document and image management systems; and, more particularly, to such a system that operates under the Microsoft Windows®[1] shell environment and which, further, is cross-platform capable and application independent. With respect to the document or image sought to be managed, the invention, thus, operates independently of both the computer platform and the application software therein operating that was used to create the document or image.

[1] Windows® is a registered trademark of the Microsoft Corporation, Redmond, Wash.

BACKGROUND OF THE INVENTION

A computer implemented document and image management system (hereinafter sometimes, "DIM system") aids in managing information created by a user's legacy software application or applications, further empowering the legacy application by the process of "image enabling." The terms "legacy software," "legacy application," "application," and "application software," as used herein, connotes software running either on a single computer device, or, alternatively, over a network of interconnected computers, that utilizes one or more database(s) to collect and store, on computer media, data that has been provided by the user thereof through operation of a computer and its software.

The legacy software often provides the user with an efficient interface for collecting and processing the user's data. Examples of such data might be image or graphic-based data; spreadsheet data; textual data; data acquired through a process of data acquisition (as in a manufacturing process or medical procedure), the representation of which approximates or models a physical manifestation, composition, process, or the like; or any combination(s) thereof. Many different legacy applications may operate, and inter-operate, on the user's computer and/or network.

In most cases, such information is merely created and stored by such legacy software, but is not managed thereby. The purpose, then, of a document and image management system is to provide the user with a way to collect, process, image, and manage all such information as may have been created by the legacy applications, but which the legacy applications do not otherwise manage, or do not otherwise manage with sufficient functionality to meet the computer user's needs.

For example, a user may wish to process, store, and manage information created by various individual and independent software into a common form. Such functionality is not typically provided by the legacy application. The user's desire for such control and management of data, then, defines the parameters for development of a DIM system.

The user may wish to use DIM system functionality through his legacy business application interface. In this regard, the DIM system must somehow be integrated into the user's legacy application(s). Because the legacy application(s) may run on any computer platform, integration of the features discussed above becomes very complicated.

The problem identified has been further compounded by the increasing and now widespread use of networks of computers, wherein it is common that individual computers in the network comprise varying hardware, operating system, and legacy application architectures. Such architectures, which are generally referred to herein as "platforms," often require that data be processed, stored, and managed in formats that may not be compatible with formats required by another platform operating in a remote, but interconnected, portion of the computer network.

An effective DIM system, then, should be capable of processing and managing all such data, regardless of the type of data, the legacy application that created the data, or the platform under which the data was created. Prior DIM systems have sought to perform such integration according to three primary models.

The first model is integration of data through software directed "calls," or redirection of the legacy application's programming logic and resulting data flow, to and through an application programming interface, or "API." In such model, the computer programmer places API calls within the user's legacy application requiring DIM system functionality, so that when the legacy application executes to the point of call, the DIM system function will be loaded and executed.

Such programming model is undesirable, however, because the programmer must analyze each of the user's legacy applications requiring DIM system functionality, and understand such application(s) well enough to implement API calls in the correct logical sequence. This implementation must be performed for each legacy application. Such programming is time consuming, and, thereby, expensive. Program support is difficult to maintain because, should an application programming change occur that changes or affects the position of a character in a DIM required field, the API no longer accomplishes an accurate index transfer; thus, a further programming change is required to return functionality to the DIM system. This method is not platform independent and, typically, is not guaranteed to work for all of the user's legacy applications.

The second model is integration of data through a process that often is called "screen-scraping." According to this model, screen-scraping software is provided td monitor the user's keystrokes effectuated upon the computer. Typically, a "hot-key" combination is programmed to activate the screen-scraping software. When the user presses the "hot-key" combination, the screen-scraping software identifies a display location for the information, as upon the computer's monitor or the like, according to a display matrix calculation. The screen-scraping software provides index data that is, in turn, passed to the DIM system.

According to the typical implementation of this model, however, the screen scraping software operates only on a "host-and-client" based platform, as in a network-based host machine according to the AS/400 architecture, or the like. The screen-scraping software, then, operates upon the AS/400 platform wherein the legacy application is running. This is disadvantageous in that the screen-scraping application, generally, is activated from the client machine. This implementation, therefore, usually is slow because the host computer must process the data, often while the client computer is forced to stand idle, and then send the result back to the client computer. This model is further disadvantageous because it is not, typically, guaranteed to work for all applications, and does not function within a "server-and-client" based architecture. Additionally, should the user change platforms or operating systems, the ability to "screen-scrape" is lost, along with the programming investment incurred.

The third model is integration of data through dynamic data exchange ("DDE") or object linking and embedding "OLE" automation; i.e., the exchange of information between software applications that have been programmed according to uniform and common data exchange protocols, typically in the Microsoft Windows® environment. In accordance with this model, only those applications supporting DDE or OLE may be enabled to provide DIM system functionality. This model does not work on all platforms. Even where the model is effective, programming changes often are required on both host/server and client applications.

It, thus, is readily apparent that an improved DIM system is desirable to overcome the deficiencies hereinabove recognized. Such a DIM system should be easily implemented in the programming and configuration of the computer. It should be platform independent. It should work on both "host-and-client" and "server-and-client" systems. It should not require alteration of the computer hardware, nor should it require programming modifications to any legacy applications or operating system software. It is, therefore, to the provision of such an improved DIM system that the present invention is directed.

Accordingly, the several objects of the present invention are:

to provide an improved DIM system that is easily implemented in the programming and configuration of a computer;

to provide an improved DIM system that is platform independent;

to provide an improved DIM system that works effectively on both "host-and-client" and "server-and-client" systems;

to provide an improved DIM system that does not require alteration of the computer hardware; and, to provide an improved DIM system that does not require programming modifications to any legacy applications or operating system software.

Other objects, features, and advantages of the present invention will become apparent to those skilled in the art by reference to the several Figures, the included Microfiche Appendix of representative source code listing, and to the Detailed Description of the Invention presented hereinbelow.

BRIEF SUMMARY OF THE INVENTION

In accordance with the several objects of the invention, presented is an improved computer implemented document and image management system that integrates and manages all such information as may have been created by the user's legacy applications, but which the legacy applications do not otherwise manage, or do not otherwise manage with. sufficient functionality to meet the computer user's needs. The improved computer implemented DIM system of the present invention operates one or more automatic index field capture (s) ("IFC"), performed according to software programming implemented within a computer preferably functioning according to the Microsoft Windows® operating system.

The present invention comprises a method and programming within and upon a computer. The programming method of the present invention obtains the indices needed. to create, or index, an image from the application running on the Windows® desktop; and, thereafter, electronically files the image. The programming method of the present invention image-enables the entire Windows® desktop, so that all applications running in windows thereunder are provided with integrated DIM system functionality.

The present invention operates by providing programming that targets a data stream that is refreshing the graphical user interface ("GUI") of a screen running on the Windows® desktop. The program continuously samples the pixels that are utilized to create the image of an application field. The sampling function enables the program to transfer data to the imaging database for subsequent use in filing, searching, and indexing the data so provided. This functionality may subsequently be used for additional user-defined or user-required operations, such as data transfer, printing, saving, retrieving, indexing, processing, managing, or the like. Each time the operating system redisplays the field on the display monitor, the program of the present invention monitors the transaction and correlates the value of data to be used.

This functionality is provided regardless of whether such applications may be physically located upon on the computer, or upon remote network client, host, or server computers. This functionality, additionally, is provided regardless of whether such applications may be logically operating upon such remote computers; and, regardless of whether such applications are logically operating upon a platform different from the Windows® platform.

This universal functionality is provided, in part, because the integrated DIM system functionality is performed at the Windows® operating system level, rather than at the specific application level; thereby, providing functionality for all applications running under the Windows® operating system. In a network configuration, since the Auto IFC is completed on the client side, the resources of the host, server, or other remote network computer are spared; thereby, providing better overall performance. Additionally, the integrated DIM system effectively can link together the processing for all applications and data for the entire enterprise.

BRIEF DESCRIPTION OF THE SEVERAL VIEWS OF THE DRAWINGS

The invention is better understood by reading the Detailed Description of the Invention with reference to the accompanying drawing Figures, in which like reference numerals denote similar structure and refer to like elements throughout, and in which.

Figure 1:
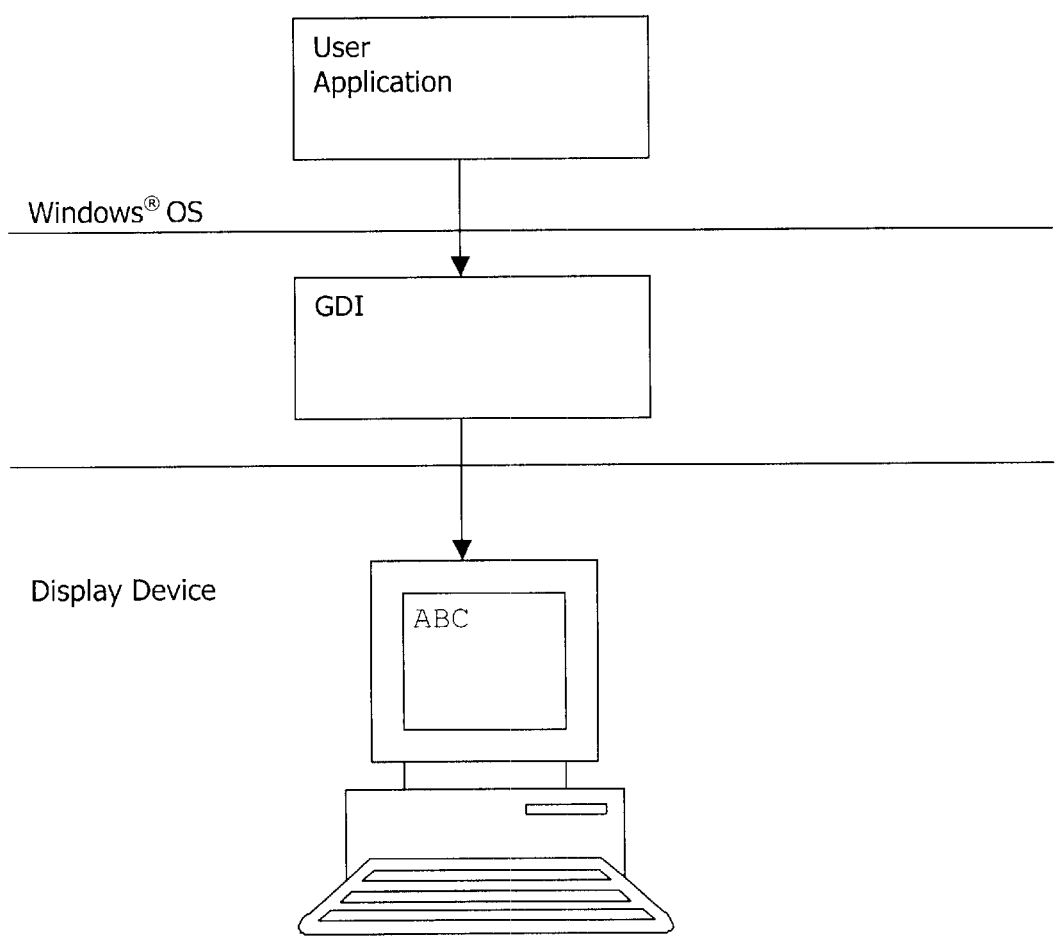
FIG. 1 is a functional block diagram of one embodiment of a typical computer utilized in connection with the present invention, demonstrating the state of the computer prior to installation and operation of the present invention.

It is to be noted that the drawing Figures presented are intended solely for the purpose of illustration and that they are, therefore, neither desired nor intended to limit the invention to any or all of the exact details of construction, method, flow, or programming shown, except insofar as they may be deemed essential to the claimed invention. Well-known program structures and operational sequence steps are depicted in block diagram form so as not to obscure the present invention unnecessarily.

DETAILED DESCRIPTION OF THE INVENTION

In describing preferred embodiments of the present invention illustrated in the Figures, specific terminology is employed for the sake of clarity. The invention, however, is not intended to be limited to the specific terminology so selected, and it is to be understood that each specific element includes all technical equivalents which operate in a similar manner to accomplish a similar purpose.

An improved document and image management system is provided for use by a digital computer in combination with a video display, monitor, or other suitable output means to provide an system that operates, preferably, under the Microsoft Windows® shell environment and which, further, is cross-platform capable and application independent. With respect to the document or image to be managed, the invention, thus, operates independently of both the computer platform and the application software therein operating that was used to create the document or image.

The software of the present invention may be implemented in any of a variety of languages; however, for purposes of this Description, the computer languages C and Assembly have been utilized. A source code listing printed by the computer of the present invention is filed herewith as a Microfiche Appendix comprising a total of three (3) microfiche sheets having a total of one hundred forty-five (145) frames. The disclosure of the Microfiche Appendix is incorporated herein by reference as though printed here in its entirety.

Referring to FIG. 1, there is shown a functional block diagram of one embodiment of a typical computer utilized in connection with the present invention, demonstrating the state of the computer prior to installation and operation of the present invention. According to FIG. 2, the invention is enabled to execute preferably on a client or stand-alone computer of the type demonstrated in FIG. 1, operating under the Windows® operating system. The invention presently is known to function properly under versions of the Windows® operating system including Windows 95®, Windows 98®, and Windows NT®. It should be noted with regard to FIG. 2 that the brand indicia "e.FileClerk™" has been utilized to represent and designate the computer implemented document image and management system software of the present invention.

The software of the present invention is preferably activated based upon intervention by a user. When the user is working in a legacy application and requires DIM system functionality to save, retrieve, index, process, print, manage, or otherwise process data, the invention is activated, typically through the use of one or more programmed "hot-key" combinations. For purposes of this disclosure, the term "data" should be understood to include, without limitation, one or more of a document; text; table; spreadsheet; graph; data acquired through a process of data acquisition (as in a manufacturing process or medical procedure), the representation of which approximates or models a physical manifestation, composition, process, or the like; other numerical representations, or any combination(s) thereof.

In the preferred embodiment of the present invention, separate "hot-keys" are provided for each DIM system function required; as a hot-key for saving an image, another for retrieving an image, and so on. Alternatively, a mouse click on the application window can trigger the retrieval or indexing function.

Through the Windows® operating system, the present invention can easily monitor triggering events of the above-described nature. Upon the occurrence of such an event, the invention functions to provide the requested DIM system function.

It is helpful to the understanding of the function and operation of the invention within the Windows® environment to understand how a display operation occurs within Windows®. When an application executes to display data on the computer display screen, it calls the Windows® Graphical Device Interface ("GDI") API. The application instructs the GDI API as to both the output data and location on the display screen.

As an example, a GDI API call might take the following form: TextOut(0,0, "ABC", 3). This call instructs the GDI to display a text string having a field length of 3 and contents comprising "ABC" at row 0, column 0 of the current application's window.

Since the goal of the invention is to capture the index string that the user's application displays on the screen, the invention first intercepts part of the program in the form of the Windows® GDI function call. With reference to the previous example, then, this interception would be for the "TextOut" call, so that whenever the TextOut function is called, the invention has access to the specific string that is being displayed. Next, when the user triggers the event for a desired DIM system function, the invention must, know where the index information is located upon the display screen. This position can be determined, for example, by the display matrix position where the mouse is clicked, or by a predefined screen template. After the invention has intercepted the index location information, it can simply instruct the Windows® GDI program as to the screen position where the index should be displayed.

Responsive to these instructions, then, the Windows® GDI program will provide the data and screen position, and will repaint the screen according to the request in the underlying application. At the same time, the underlying application calls the Windows® GDI API to redisplay the string at that location.

It should be remembered that part of the program of the invention has intercepted the GDI function call, so it essentially "spies" on what is being displayed. In this way, the invention can capture any data information displayed on any location on the display screen by any application running under Windows®. The invention, then, can use this information as an index to complete the DIM system retrieval or indexing function. When the user's application responds to the Windows® message by calling the Windows® GDI API, the program of the invention then intercepts the message and executes the required DIM system tasks, all being transparent to the user, the operating system, and the underlying application. Similarly, the integration performed according to the above description is completed without the need to revise or alter any user application.

Furthermore, because all applications perform Windows® messaging and GDI calls in the same way, the program of the present invention is able to image enable all desktop applications at the same time.

Figure 2:
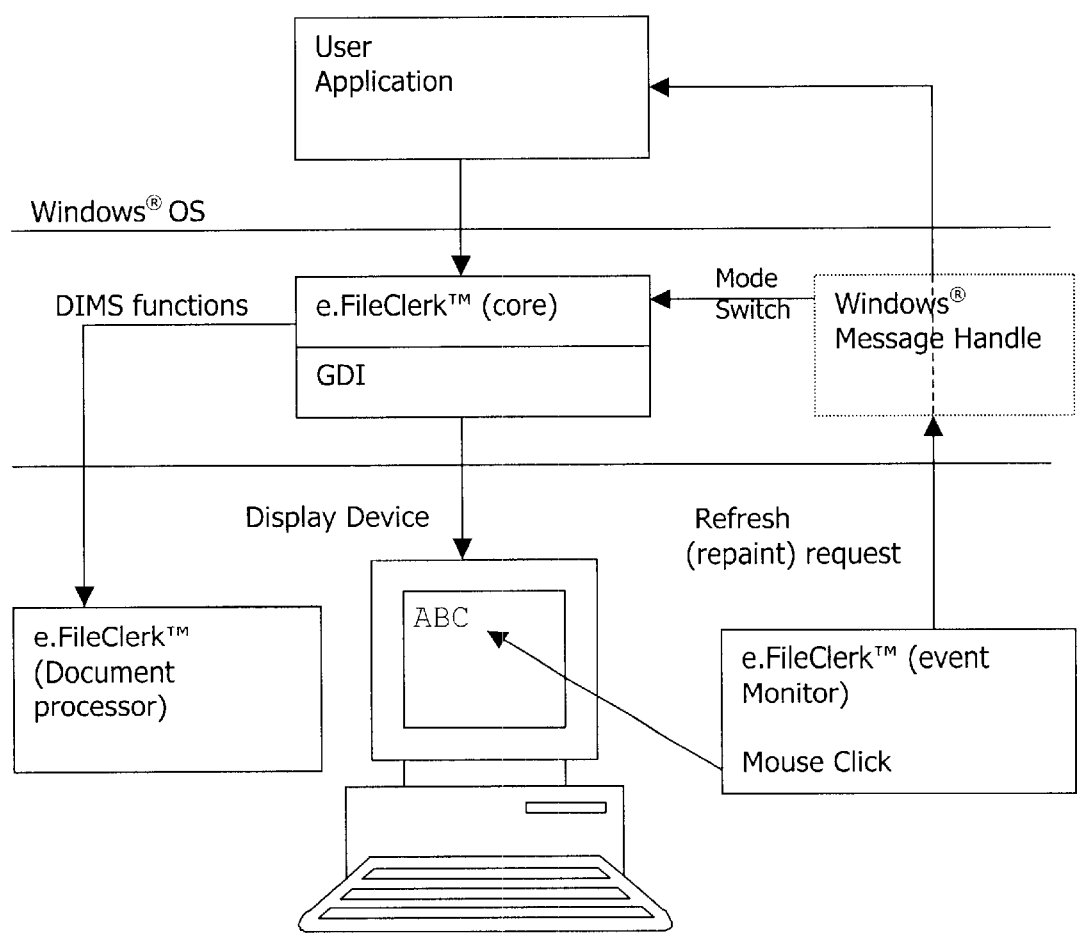
FIG. 2 is a functional block diagram of one embodiment of a typical computer utilized in connection with the present invention, demonstrating the state of the computer following installation and operational execution of the present invention; and, FIG. 3 is a high-level flow chart demonstrating the functional operation of the present invention, a preferred embodiment of the code of which is reproduced in the Microfiche Appendix hereto.

In operation, then, and with further reference to FIG. 2, when the triggering event takes place, the invention acts to gather such information as may be required to fulfill the retrieval or indexing of a specific document. The information so gathered comprises the index values located on the display device window bearing the legacy application screen output. These indices are then used to retrieve, save, or otherwise process the data or document.

Figure 3:
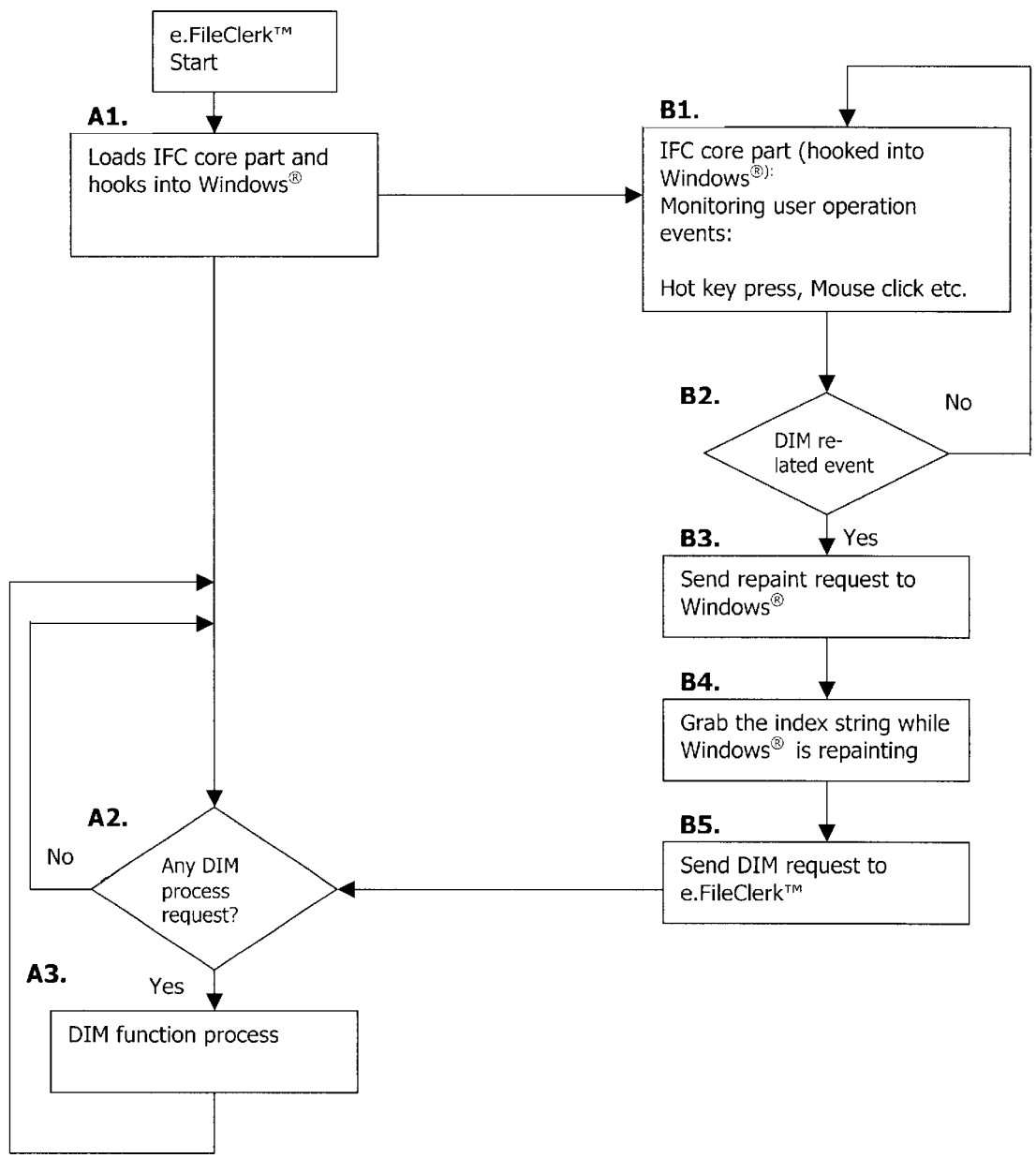

Referring now to FIG. 3, following the run start of the invention at the top of the left column, the IFC core, designated generally at B1, is loaded. The IFC core B1 is hooked to the Windows® operating system in order to detect user-initiated events, such as mouse clicks, the pressing of keys, or the like.

Block A2 represents portions of the invention that continue interoperation with the IFC core B1 in order to ascertain whether there is a DIM function request to be processed. If so, block A2 calls the corresponding imaging function routines A3. Imaging function routines A3 serve to process the imaging function required by the user, such as searching, indexing, or the like.

Returning now to the rightmost column of FIG. 3, in order to more fully describe the processing contained therein, the IFC core B1 monitors all events occurring on the Windows® desktop. For example, if a user were to click the left button of a mouse, the occurrence of the event, along with such related information as the specific window in which the click occurred, the position of the screen clicked, additional keyboard inputs, or the like, are collected and passed to procedure B2 for checking. Windows® routes all events to procedure B2 before the events go to the destination window (s), because B1 procedures were hooked to, or associated with, all threads running on the Windows® desktop.

Procedure B2, then, checks all events and related information collected by B1 to determine whether a predefined imaging function action (i.e., a hot-key combination for searching an image; a hot-key combination for indexing the image; a mouse click for a point and shoot request; or the like) has been performed. If so, procedure B2 will collect all such information as is required to "grab" the index string when procedure B3 requests the Windows® GDI to repaint the destination window. This required information may take the form of a location of the index string relative to the start of the window, the delimiter of the index string, or the like.

It is the function of procedure B3 to transparently obtain an index string from the destination window. As an illustration of the operation of this procedure, we will assume a "point and shoot"-type operation. For example, at destination window row 2, starting from column 6, there is a string, 'Inter-American Data, Inc'. The user wishes to use this string as a vender name to search the imaging data base. The user first opens a Search Dialog Box from the e.FileClerk menu. This operation will turn on the "point and shoot" mode. The user then moves the mouse cursor over the string and left clicks. The string comprising, 'Inter-American Data, Inc.', will "shoot" into the Search Dialog Box. This is performed by repainting the destination window, detailed as follows. The invention can easily repaint the window by the Windows® API: RedrawWindow( ) command. But, in order to "grab" the required string, as at procedure B4, before the repainting operation, the invention intercepts its own GDI function command (e.g., TextOut, ExtTextOut, or the like). It then correlates this information to corresponding Windows® GDI functions, so that when displaying text in destination window during the process of repainting the window, the GDI function of the invention is called. From this process, the invention can calculate the position of the strings to be displayed and filter the string required by the user.

Assuming that during the repainting operation, the IFC GDI function was called, and in view of the above, the role of procedure B4, then, is to calculate the position of the string(s), to buffer the string(s) and their location information, and to define this information as the index string.

At this point, the indexed, or "grabbed," string is passed to procedure B5. Procedure B5 passes the string(s) obtained by procedure B4 to e.FileClerk at block A2 for subsequent processing of the DIM function request in order to fulfill the required imaging function.

In summary, when triggered, the present invention automatically captures, through Auto Index Field Capture logic, the required information; and, thereafter, completes the DIM system function for the user. In most of the cases, the index information is located upon the video display screen within the user's current application window. Thus, when the user executes a mouse click on an index string on the display screen, the present invention will intercept the value and process the associated data in accordance with the user's requirement.

Although the preferred embodiment has been described in the context of a Windows® operating system environment, this method of the present invention can be utilized in association with other, non-Windows® operating systems. Additionally, and with reference to FIG. 2, one skilled in the art can observe that the core portion of the present invention may actually be integrated within, and become part of, the operating system. Such an implementation would be beneficially efficient. Furthermore, such integration would provide a heretofore-unavailable way for developers of different fields of technology to establish a logical link among different products or applications without significant program revisions. Such developers can, thereby, easily link, or "integrate," their product to those products developed by others, without the need to incorporate the core application code of the present invention into their program.

The present invention, therefore, is beneficial and novel in that it provides a previously unknown level of data integration to the user's desktop applications. Previously known DIM system integration methods are weak, and have been observed to cause many problems. In such systems, the user has had no control. The present invention as disclosed herein, elegantly and efficiently solves the problems hereinabove identified and long known in this field of endeavor.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A data information management system comprising:
   a.) a computer system having a central processing unit, data storage means, and a memory architecture;
   b.) an operating system for controlling the operation of said computer system;
   c.) a display means capable of displaying output display data within a window on said display means;
   d.) an application program associated with a window on said display means;
   e.) a display data stream including address information for enabling output display on said display means; and,
   f.) logic means for intercepting a function call from said application program to a graphical device interface of said operating system and providing means for detecting a user-initiated event;
   g.) said logic means, after detecting said user-initiated event, causing said operating system to request said applcation program to refresh said application window content on said output display through a graphical device interface call, and during said refresh operation, capturing a parameter of said display data stream in textual format for use as an index or data value associated with said output display data displayed on said display means, and providing said index or data value to complete a document image management system function;
   whereby the operation of said logic means is transparent to the user, the operating system, and the application program.

2. The data information management system of claim 1, wherein said logic means provides a user with such selective document image management system functions as saving, retrieving, indexing, processing, printing, or managing data and image information within said computer system.

3. The data information management system of claim 1, wherein said logic means may be interoperable with a plurality of windows, each of said windows being interoperable with a separate application program.

4. The data information management system of claim 1 wherein said computer system further comprises a network of interconnected computers.

5. The data information management system of claim 4, wherein said network of interconnected computers comprises a first computer operating said application program, and a second computer operating said logic means.

6. The data information management system of claim 1 wherein said logic means derives said index or data value from position information of said display data stream.

7. The data information management system of claim 1 wherein said logic means directs said redraw through a call to a graphical device interface of said operating system.

8. The data information management system of claim 1 wherein said user-initiated event is selected from the group consisting of a keyboard event or a mouse event.

9. In a computer system having a central processing unit, a memory architecture, display means capable of displaying output display data within one of a plurality of windows capable of overlapping on said display means, an application program associated with one of said plurality of windows and having a display data stream including address information for enabling output display on said display means, an operating system means for providing an operating environment for said computer system, the improvement comprising:
   logic means for providing a windowing environment for intercepting a function call from said application program to a graphical device interface of said operating system and, subsequent to a user-initiated event, causing said operating system to request said application program to refresh said application window content on said output display through a graphical device interface call, and during said refresh operaton, capturing a parameter of said output display data in textual format for use as an index or data value for data in an application program associated with one of said plurality of windows displayed on said display means, and for providing said index or data value to complete a document image management system function, said logic means being interoperable with said operating system means and said application program,
   whereby the stated functionality of said logic means is transparent to the user, the operating system means, and the application program, and is useful for linking a plurality of dissimilar or otherwise incompatible application programs without changing the application programs or affecting their underlying functionality.

10. The system of claim 9, wherein said logic means provides a user with such selective document image management system functions as saving, retrieving, indexing, processing, printing, or managing data and image information within said computer system.

11. The system of claim 9, wherein said logic means may be interoperable with a plurality of windows, each of said windows being interoperable with a separate application program.

12. The system of claim 9 wherein said computer system further comprises a network of interconnected computers.

13. The system of claim 12, wherein said network of interconnected computers comprises a first computer operating said application program, and a second computer operating said logic means.

14. The improved computer system of claim 6 wherein said logic means derives said index or data value from position information of said display data.

15. The improved computer system of claim 9 wherein said logic means directs said redraw through a call to a graphical device interface of said operating system.

16. A method for processing of display data for saving, retrieving, indexing, processing, printing, or managing document and image information within a computer system, said computer system having a display means and having means for controlling and defining a plurality of windows within an operating environment, said method comprising the steps of:
   a.) intercepting from an application program operating upon said computer system a function call to a graphical device interface within said operating environment and intercepting a user intervention event from said operating environment;
   b.) causing said operating environment to request said application program to refresh content within an application window on said display through a graphical device interface call;
   c.) during said refresh operation, capturing a parameter of a data stream for said display in textual format for use in determining an index or data value associated with data in an application program associated with one of said plurality of windows displayed on said display means; and, d.) providing said index or data value for said data to complete a document image management system function.

17. The method of claim 16, wherein said document image management system function comprises such user-selected functions as saving, retrieving, indexing, processing, printing, or managing data and image information within said computer system.

18. The method of claim 16, comprising the additional step of determining a plurality of index values and positions upon said video display means, each of said index values and positions being associated with data in one of a plurality of application programs, each application program being associated with a window displayed on said video display means.

19. The method for processing of display data of claim 16 wherein said index or data value is derived from position information of said display data stream.

20. The method for processing of display data of claim 16 wherein said redraw is directed through a call to a graphical device interface of said operating system.

* * * * *